Patented Oct. 31, 1950

2,527,578

UNITED STATES PATENT OFFICE 2,527,578

SALTS OF CONDENSATES OF ROSIN WITH UNSATURATED CYCLIC HYDROCARBONS

Alfred L. Rummelsburg, Wilmington, Del., assignor to Hercules Powder Company, Wilmington, Del., a corporation of Delaware No Drawing. Application July 11, 1947, Serial No. 760,492

13 Claims. (Cl. 106—227)

This invention relates to the salts of resinous condensation products of rosin with unsaturated carbocyclic hydrocarbons and to varnish compositions containing them.

Rosin has long been known to be deficient, alone or in the form of its esters, for use in varnishes, particularly because of its softness and poor bodying characteristics. Various modifications such as polymerization, etc., have been suggested in an attempt to overcome these deficiencies. While some improvemnt has been obtained by the polymerization of rosin, an entirely satisfactory product has not been produced. Metal resinates of polymerized rosin have also been prepared, but in order to obtain the desired increased melting point, etc., it has been necessary to incorporate a large percentage of the metal in the compound which has resulted in a serious reduction in the solubility of these resinates in organic solvents and, accordingly, they are not capable of incorporation in a varnish in the desired amounts.

Now in accordance with this invention it has been found that metal salts of a condensate of rosin with an unsaturated carbocyclic hydrocarbon may be formed, which salts are particularly valuable for use in protective coatings such as varnish, having excellent bodying and drying characteristics and forming harder films of improved water resistance. The metal salts of the rosin condensates in accordance with this invention are high-melting resinous materials which contain substantially smaller contents of combined metals than were previously possible for a resinate of comparable melting point. As a result they may be incorporated in a varnish or paint in the same proportions as the usual nonmetallic resins. These new products not only contribute increased viscosities to varnishes, but the varnishes containing them become less reduced in viscosity on storage.

The following examples are illustrative of the preparation of the new metal salts of the rosin-unsaturated carbocyclic hydrocarbon condensates in accordance with this invention. All parts and percentages are by weight unless otherwise indicated.

EXAMPLE I

A rosin-styrene condensate was prepared by passing boron trifluoride gas into a solution of 458 parts of styrene and 600 parts of wood rosin in 900 parts of benzene with agitation, until 20 parts of the boron trifluoride had been absorbed, the temperature being held at 11–28° C. during the addition. The reaction mixture was then allowed to stand for 4 hours at that temperature, after which it was poured into an equal volume of water and washed with warm water to remove the catalyst. The solvent was removed by distillation and the rosin-styrene condensate remaining as a residue amounted to 1043 parts and had the following analysis: acid number 89.5; drop melting point 135° C.; and capillary melting point—softens 100°–105° C., melts 110°–116° C.

Drier metal salts of this rosin-styrene condensate were prepared by heating the condensate to 250° C. and then gradually adding, with stirring, the metal salt during a 15–25 minute period while simultaneously increasing the temperature to about 300°–310° C. After continuing the stirring for an additional 10–15 minute period, the resin was cooled and analyzed. The data on the preparation and characteristics of the metal salts of the rosin-styrene condensate are given in Table I.

TABLE I

*Metal salts of rosin-styrene condensate*

| Parts of Condensate | Salt | Parts of Salt | Maximum Temperature | Yield of Product | Per Cent Metal in Product | Capillary Melting Point of Product | |
|---|---|---|---|---|---|---|---|
| | | | | | | Softens | Melts |
| | | | °C. | | | °C. | °C. |
| 15.00 | Mn(OAc)$_2$.4H$_2$O | 2.94 | 300–310 | 15.1 | 4.4 | 127–133 | 140–147 |
| 15.00 | Co(OAc)$_2$.4H$_2$O | 2.99 | 300–310 | 14.8 | 4.8 | 110–117 | 138–170 |
| 15.00 | Ca(OAc)$_2$.H$_2$O | 2.11 | 300–310 | 15.3 | 3.2 | 117–122 | 136–144 |
| 15.00 | Al$_2$O(OAc)$_4$.4H$_2$O | 1.51 | 320 | 14.8 | 1.4 | 135–140 | 160–169 |
| 15.00 | Zn(OAc)$_2$.2H$_2$O | 2.63 | 300–310 | 15.2 | 5.1 | 107–113 | 132–140 |
| 15.00 | Pb(OAc)$_2$.3H$_2$O | 4.55 | 300–310 | 17.2 | 14.5 | 116–122 | 135–142 |
| 15.00 | Mn(OAc)$_2$.4H$_2$O | 1.47 | 290 | 14.6 | 2.3 | 110–115 | 124–129 |
| 15.00 | Co(OAc)$_2$.4H$_2$O | 1.49 | 290 | 15.4 | 2.3 | 108–113 | 120–128 |
| 15.00 | Ca(OAc)$_2$.H$_2$O | 1.06 | 290 | 15.0 | 1.6 | 111–117 | 127–132 |
| 15.00 | Al$_2$O(OAc)$_4$.4H$_2$O | 0.76 | 320 | 13.0 | 0.8 | 124–129 | 137–143 |
| 15.00 | Zn(OAc)$_2$.2H$_2$O | 1.32 | 290 | 14.9 | 2.6 | 109–114 | 124–129 |
| 15.00 | Pb(OAc)$_2$.3H$_2$O | 2.28 | 290 | 15.7 | 7.9 | 115–120 | 127–132 |

EXAMPLE II

A rosin-cyclopentadiene condensate was prepared by the method described for preparing the condensate in Example I except that 112 parts of cyclopentadiene were substituted for the styrene used in that example, the amount of catalyst used was 12 parts instead of 20 parts, and the temperature during the boron trifluoride absorption was 10°–15° C. The rosin-cyclopentadiene prepared amounted to 710 parts and contained about 15.5% combined cyclopentadiene which is equivalent to about 1 mole of cyclopentadiene per mole of rosin. It had the following analysis: acid number 134; drop melting point 129° C.; and capillary melting point—softens 81°–86° C., melts 94°–99° C.

Drier metal salts of this condensate were prepared by heating the condensates to 250° C. and then gradually adding the metal salt, with stirring, during 20–30 minutes while simultaneously increasing the temperature to 290° C. Heating then was continued for 10–20 minutes with stirring and the temperature was increased to 310° C. after which the resin was cooled. The data on the preparation and characteristics of the metal salts of the rosin-cyclopentadiene condensate are given in Table II.

TABLE II

*Metals salts of rosin-cyclopentadiene condensate*

| Parts of Condensate | Salt | Parts of Salt | Yield of Product | Per Cent Metal in Product | Capillary Melting Point of Product | |
|---|---|---|---|---|---|---|
| | | | | | Softens | Melts |
| | | | | | ° C. | ° C. |
| 15.00 | Ca(OAc)$_2$.H$_2$O | 3.15 | 16.0 | 4.6 | 133–139 | 178–185 |
| 15.00 | Zn(OAc)$_2$.2H$_2$O | 3.93 | 15.5 | 7.5 | 122–127 | 145–151 |
| 15.00 | Pb(OAc)$_2$.3H$_2$O | 6.76 | 18.5 | 19.9 | 128–133 | 150–156 |
| 15.00 | Ca(OAc)$_2$.H$_2$O | 1.58 | 15.0 | 2.4 | 122–127 | 145–150 |
| 15.00 | Zn(OAc)$_2$.2H$_2$O | 1.97 | 14.0 | 4.2 | 112–117 | 125–130 |
| 15.00 | Pb(OAc)$_2$.H$_2$O | 3.38 | 16.9 | 10.9 | 128–133 | 144–149 |

EXAMPLE III

A rosin-coumarone-indene condensate was prepared by absorbing 16 parts of boron trifluoride in a solution of 800 parts of wood rosin and 440 parts of a coumarone-indene distillation cut of solvent naphtha (containing 60% polymerizable constituents), boiling at 80°–119° C. at 100 mm. pressure, $n_D^{20}$ 1.5415, in 2000 parts of benzene, the temperature being kept below about 12° C. during the absorption of the boron trifluoride. The reaction mixture was allowed to warm to room temperature and after standing for 4 hours was washed with warm water to remove the catalyst. The solvent was removed by distillation and the rosin-coumarone-indene condensate remaining as a residue amounted to 1043 parts and had the following analysis: acid number 122; drop melting point 141° C.; and capillary melting point—softens 101°–106° C., melts 114°–119° C.

Drier metal salts of this condensate were prepared by heating the condensate to 250° C. and then gradually adding the metal salt, with stirring, during 20–30 minutes while simultaneously increasing the temperature to 290° C. Heating was then continued for 10–20 minutes with stirring and the temperature was increased to 310° C. after which the resin was cooled. The data on the preparation and characteristics of the metal salts of the rosin-coumarone-indene condensate are given in Table III.

TABLE III

*Metal salts of rosin-coumarone-indene condensate*

| Parts of Condensate | Salt | Parts of Salt | Yield of Product | Per Cent Metal in Product | Capillary Melting Point of Product | |
|---|---|---|---|---|---|---|
| | | | | | Softens | Melts |
| | | | | | ° C. | ° C. |
| 15.00 | Ca(OAc)$_2$.H$_2$O | 2.87 | 16.2 | 4.1 | 132–138 | 172–180 |
| 15.00 | Zn(OAc)$_2$.2H$_2$O | 3.38 | 15.2 | 6.6 | 132–138 | 159–165 |
| 15.00 | Pb(OAc)$_2$.3H$_2$O | 6.18 | 18.2 | 18.5 | 123–128 | 155–162 |
| 15.00 | Ca(OAc)$_2$.H$_2$O | 1.44 | 15.3 | 2.2 | 125–131 | 145–152 |
| 15.00 | Zn(OAc)$_2$.2H$_2$O | 1.69 | 14.7 | 3.4 | 123–128 | 138–144 |
| 15.00 | Pb(OAc)$_2$.3H$_2$O | 3.09 | 16.0 | 10.6 | 123–128 | 144–150 |

EXAMPLE IV

A rosin-divinylbenzene condensate was prepared by passing boron trifluoride gas into a solution of 860 parts of wood rosin and 140 parts of divinylbenzene (containing about 40% divinylbenzene and about 60% ethyl vinylbenzene) in 1290 parts of benzene, until 18 parts of the boron trifluoride had been absorbed, the temperature being held at 20°–54° C. during the addition. The reaction mixture was then allowed to stand for 4 hours at room temperature, after which it was poured into an equal volume of water and washed with warm water to remove the catalyst. The solvent was removed by distillation and the rosin-divinylbenzene condensate remaining as a residue amounted to 967 parts and had the following analysis: acid number 133; drop melting point 145° C.; and capillary melting point—softens 100°–105° C., melts 112°–117° C.

Drier metal salts of this condensate were prepared by heating the condensate to 250° C. and then gradually adding the metal salt, with stirring, during 20–30 minutes while simultaneously increasing the temperature to 290° C. Heating was continued for 10–20 minutes with stirring and the temperature was increased to 310° C. after which the resin was cooled. The data on the preparation and characteristics of the metal salts of rosin-divinylbenzene condensate are given in Table IV.

TABLE IV

*Metal salts of rosin-divinylbenzene condensate*

| Parts of Condensate | Salt | Parts of Salt | Yield of Product | Per Cent Metal in Product | Capillary Melting Point of Product | |
|---|---|---|---|---|---|---|
| | | | | | Softens | Melts |
| | | | | | °C. | °C. |
| 15.00 | $Ca(OAc)_2 \cdot H_2O$ | 1.59 | 15.0 | 2.4 | 137–142 | 157–163 |
| 15.00 | $Zn(OAc)_2 \cdot 2H_2O$ | 1.98 | 14.0 | 4.2 | 127–132 | 142–147 |
| 15.00 | $Pb(OAc)_2 \cdot 3H_2O$ | 3.42 | 15.7 | 11.8 | 136–141 | 153–159 |

The rosin condensates from which the metal salts are prepared in accordance with this invention may be prepared by the condensation of a rosin with an unsaturated carbocyclic hydrocarbon. The rosins which are used are those having ethylenic unsaturation, such as the natural rosins of the type of wood and gum rosin, and treated rosins such as heat-bleached, heat-treated, and isomerized rosins.

The unsaturated cyclic hydrocarbons used are those which are capable of selfpolymerization to hemicolloids; i. e., to polymers having at least 20 to 100 units per polymer molecule. The unsaturation of the cyclic hydrocarbon may be in the cyclic structure or in a side chain attached to the ring. Carbocyclic compounds of this type and suitable for use in this invention are compounds having a single center of unsaturation such as styrene, alpha-methyl styrene, alpha-methyl-para-methyl styrene, dichloro-styrene, indene, and phenyl acetylene; and compounds having at least two centers of unsaturation such as divinyl benzene, diisopropenyl benzene, and cyclopentadiene. Other unsaturated cyclic compounds which may be condensed with rosin for the preparation of the rosin condensates used in this invention are unsaturated heterocyclic compounds which are capable of selfpolymerization to hemicolloids. Heterocyclics of this type are those which are unsaturated and which contain no other functional group such as coumarone, furane, thiophene, pyrrole, vinyl pyridine, etc. Mixtures of any of these unsaturated cyclics may also be used. The molecular ratio of rosin to unsaturated cyclic hydrocarbon in the condensation may vary from about 0.1 to 20. Any unreacted unsaturated cyclic compound remaining may be removed from the condensation product, as for example by distillation.

The condensation is usually carried out in the presence of a catalyst, such as the Friedel-Crafts type catalysts or a mineral acid condensation catalyst, at a temperature of −50° C. to 150° C., depending upon the catalyst used. The condensation may be carried out in the absence of a catalyst in which case a higher reaction temperature is desirable such as 125°–350° C. An inert solvent may be used in the preparation of the condensate, if desired, in order to improve the fluidity of the reactants and to facilitate the dispersion of the catalyst.

The condensation products of rosin with unsaturated carbocyclic hydrocarbons having a single center of unsaturation appear to be high molecular weight monocarboxylic acids containing chiefly only one resin acid nucleus per molecule. These acids may be mixtures of condensation products wherein one or more molecules of unsaturated carbocyclic hydrocarbon, for example, is condensed with a single resin acid molecule. The condensation produces of rosin with unsaturated carbocyclic hydrocarbons having more than one center of unsaturation in the molecule appear to contain polybasic acids wherein more than one resin acid nucleus has been condensed with the polyunsaturated carbocyclic compound. Moreover, the condensate appears to be a mixture of monocarboxylic acids and polycarboxylic acids depending upon the conditions used in effecting the condensation. An example of such a condensate is that of rosin and divinyl benzene. The condensation products containing various ratios of resin acid to carbocyclic compound are prepared by varying the amount of unsaturated carbocyclic compound added in the condensation and by controlling the rate of condensation.

Any metal salt of the rosin-condensates of this invention may be prepared as, for example, the alkali metal salts, alkaline earth salts, and the usual metallic salts. Of particular importance are the water-insoluble or drier metal salts since these are the salts of most value for use in varnishes and other protective coatings. Among the drier metal salts which may be mentioned are the calcium, zinc, cobalt, manganese, lead, copper, aluminum, etc., salts.

The metal salts of the rosin-carbocyclic hydrocarbon condensates, and particularly the drier metal salts, are most conveniently prepared by heating the rosin condensates with the oxide or fatty acid salt, such as the acetate, butyrate, etc., of the metal to a temperature of from about 200° C. to about 360° C. and preferably to a temperature of about 250° C. to about 340° C. until the reaction is complete. The water-insoluble metal salts may also be prepared by forming an aqueous solution of an alkali metal salt of the rosin condensate and then adding a water-soluble salt of the drier metal.

The salts of the different metals will contain an amount of the metal which will vary with the equivalent combining proportion of the particular metal. The salts may be the neutral salts or may be acid salts in which an insufficient amount of the metal is present to completely neutralize the rosin condensate. For use in the preparation of varnishes, the metal salts of the rosin condensates will contain at least 1% of combined metal. When high-melting rosin condensates, i. e. those having a melting point of 120–140° C. or above are used to prepare the salt, usually an amount of metal less than the equivalent based on its valence is added, whereas in the case of the rosin condensates having melting points of less than 100° C. it may be desirable to add as much as one equivalent of the metal.

Varnishes may be produced from the metal salts of the rosin condensates of this invention by the customary varnish-making techniques. Drying oils which may be used in combination with these metal salts are linseed oil, tung oil, dehydrated castor oil, soya oil, fish oil, sunflower seed oil, rapeseed oil, perilla oil, oiticica oil, hempseed oil, etc. Driers such as lead and cobalt naphthenates are usually added. Any of the usual solvents, such as the volatile petroleum hydrocarbons, may be used as thinners for the varnishes, the amount of solvent added being that amount which will yield a free-flowing mixture capable of application in a thin film. The following example illustrates the preparation of varnishes with the metal salts in accordance with this invention.

EXAMPLE V

Varnishes having 25 gal. oil length were prepared using the calcium and zinc salts described in the foregoing examples. In each case the varnish was prepared by heating 5 parts of the rosin condensate salt with 10 parts of linseed oil having a viscosity of Y (Gardner-Holdt) to a temperature of about 585° F. for 20-30 minutes with stirring. The mixture was then held at this temperature until it began to develop viscosity and gave a good pill on glass. After cooling to 430°-540° F., 15 parts of mineral spirits were added as a thinner and about 0.5% lead and 0.07% cobalt were added in the form of their tall oil salts. Thin films of the varnishes were poured on glass plates and then allowed to air-dry. All of the films were dry within 17 hours. The characteristics of each of the varnishes so prepared are given in Table V.

TABLE V
*Varnishes containing salts of rosin condensates*

| Condensate | Salt | Per Cent Metal in Condensate Salt | Capillary Melting Point of Salt | Time to Reach Pill, Min. | Viscosity of Thinned Varnish | Drying Time, Hrs. |
|---|---|---|---|---|---|---|
| | | | °C. | | | |
| Rosin-Styrene | Ca | 3.2 | 136-144 | 25 | C | 17 |
| Do | Zn | 2.6 | 124-129 | 27 | A | 17 |
| Rosin-Coumarone-Indene | Ca | 4.1 | 172-180 | 28 | C | 17 |
| Do | Zn | 3.4 | 138-144 | 30 | A | 17 |
| Rosin-Cyclopentadiene | Ca | 4.6 | 178-185 | 21 | D | 17 |
| Do | Zn | 4.2 | 125-130 | 22 | A | 17 |
| Rosin-Divinylbenzene | Ca | 2.4 | 157-163 | 23 | A | 17 |
| Do | Zn | 4.2 | 153-159 | 28 | A | 17 |

The varnishes prepared from the drier metal salts of the rosin condensates, as illustrated above, are superior to varnishes prepared from the prior art resins, having excellent bodying and drying characteristics and forming harder films which have an improved water-resistance. These varnishes also become less reduced in viscosity on storage.

The drier metal salts of the rosin condensates in accordance with this invention are useful as resins and driers in protective coatings such as varnishes, paints, etc., and in printing inks, etc.

What I claim and desire to protect by Letters Patent is:

1. A metal salt of the condensation product of a rosin with an unsaturated carbocyclic hydrocarbon capable of selfpolymerization to a hemicolloid the molecular ratio of rosin to unsaturated carbocyclic hydrocarbon in said condensation product being within the range of about 0.1-20.

2. A water-insoluble metal salt of the condensation product of a rosin with an unsaturated carbocyclic hydrocarbon having a single center of unsaturation and being capable of selfpolymerization to a hemicolloid the molecular ratio of rosin to unsaturated carbocyclic hydrocarbon in said condensation product being within the range of about 0.1-20.

3. A water-insoluble metal salt of the condensation product of a rosin with an unsaturated carbocyclic hydrocarbon having at least two centers of unsaturation and being capable of selfpolymerization to a hemicolloid the molecular ratio of rosin to unsaturated carbocyclic hydrocarbon in said condensation product being within the range of about 0.1-20.

4. A metal salt of the condensation product of rosin with styrene the molecular ratio of rosin to styrene in said condensation product being within the range of about 0.1-20.

5. A metal salt of the condensation product of rosin with indene the molecular ratio of rosin to indene in said condensation product being within the range of about 0.1-20.

6. A metal salt of the condensation product of rosin with divinyl benzene the molecular ratio of rosin to divinyl benzene in said condensation product being within the range of about 0.1-20.

7. A water-insoluble metal salt of the condensation product of rosin with styrene the molecular ratio of rosin to styrene in said condensation product being within the range of about 0.1-20.

8. A water-insoluble metal salt of the condensation product of rosin with indene the molecular ratio of rosin to indene in said condensation product being within the range of about 0.1-20.

9. A water-insoluble metal salt of the condensation product of rosin with divinyl benzene the molecular ratio of rosin to divinyl benzene in said condensation product being within the range of about 0.1-20.

10. A coating composition comprising a water-insoluble metal salt of the condensation product of a rosin with an unsaturated carbocyclic hydrocarbon capable of selfpolymerization to a hemicolloid the molecular ratio of rosin to unsaturated carbocyclic hydrocarbon in said condensation product being within the range of about 0.1-20 and a solvent.

11. A coating composition comprising a water-insoluble metal salt of the condensation product of a rosin with an unsaturated carbocyclic hydrocarbon capable of selfpolymerization to a hemicolloid the molecular ratio of rosin to unsaturated carbocyclic hydrocarbon in said condensation product being within the range of about 0.1-20, a drying oil, and a solvent.

12. A calcium salt of the condensation product of a rosin with an unsaturated carbocyclic hydrocarbon capable of selfpolymerization to a hemicolloid, the molecular ratio of rosin to unsaturated carbocyclic hydrocarbon in said condensation product being within the range of about 0.1-20.

13. A zinc salt of the condensation product of a rosin with an unsaturated carbocyclic hydrocarbon capable of selfpolymerization to a hemicolloid, the molecular ratio of rosin to unsaturated carbocyclic hydrocarbon in said condensation product being within the range of about 0.1–20.

ALFRED L. RUMMELSBURG.

REFERENCES CITED

The following references are of record in the file of this patent:

UNITED STATES PATENTS

| Number | Name | Date |
| --- | --- | --- |
| 1,942,531 | Barrett | Jan. 9, 1934 |
| 2,218,284 | Hovey | Oct. 15, 1940 |
| 2,468,770 | Morris et al. | May 3, 1949 |